(12) United States Patent
Marquardt

(10) Patent No.: US 9,553,496 B2
(45) Date of Patent: Jan. 24, 2017

(54) LOW-INERTIA DIRECT DRIVE HAVING HIGH POWER DENSITY

(75) Inventor: Rainer Marquardt, Riemerling (DE)

(73) Assignee: LEANTEC Motor GmbH, Saalfeld (DE)

( * ) Notice: Subject to any disclaimer, the term of this patent is extended or adjusted under 35 U.S.C. 154(b) by 75 days.

(21) Appl. No.: 12/922,773

(22) PCT Filed: Mar. 13, 2009

(86) PCT No.: PCT/EP2009/001854
§ 371 (c)(1),
(2), (4) Date: Nov. 23, 2010

(87) PCT Pub. No.: WO2009/115247
PCT Pub. Date: Sep. 24, 2009

(65) Prior Publication Data
US 2011/0057532 A1  Mar. 10, 2011

(30) Foreign Application Priority Data

Mar. 15, 2008 (DE) .......... 10 2008 014 556

(51) Int. Cl.
| | |
|---|---|
| *H02K 21/24* | (2006.01) |
| *H02K 1/16* | (2006.01) |
| *H02K 16/00* | (2006.01) |
| *H02K 1/20* | (2006.01) |
| *H02K 1/27* | (2006.01) |
| *H02K 1/28* | (2006.01) |
| *H02K 1/02* | (2006.01) |

(52) U.S. Cl.
CPC .............. *H02K 21/24* (2013.01); *H02K 1/20* (2013.01); *H02K 1/2793* (2013.01); *H02K 1/28* (2013.01); *H02K 1/02* (2013.01); *H02K 2201/12* (2013.01)

(58) Field of Classification Search
CPC ........ H02K 21/24; H02K 16/04; H02K 16/00; H02K 1/182; H02K 1/2793; H02K 21/026
USPC ....... 310/156.32, 156.35, 266, 268, 112, 114
See application file for complete search history.

(56) References Cited

U.S. PATENT DOCUMENTS 3,469,134 A * 9/1969 Bering et al. ................. 310/164
4,095,150 A * 6/1978 Senckel ...................... 310/12.24
(Continued)

FOREIGN PATENT DOCUMENTS

| AT | 504456 A1 | 5/2008 |
| AT | 504456 A1 | 5/2008 |

(Continued)

OTHER PUBLICATIONS

Machine Translation, DE 102006036707 B3, Direct drive of short axial spacing, Feb. 28, 2008.*
(Continued)

*Primary Examiner* — Thomas Truong
(74) *Attorney, Agent, or Firm* — SoCal IP Law Group LLP; Mark A. Goldstein

(57) ABSTRACT

The invention relates to electric machines having permanent excitation, having a very high specific torque and a high power density when correspondingly supplied through power electronics. They are characterized by advantageous production possibilities using composite materials that can be pressed in molds. The nonferrous rotor construction and low required magnet mass results in an extremely low moment of inertia.

15 Claims, 11 Drawing Sheets

(56) References Cited

U.S. PATENT DOCUMENTS

| | | | |
|---|---|---|---|
| 5,289,072 A * | 2/1994 | Lange | 310/266 |
| 5,751,089 A * | 5/1998 | Stridsberg | 310/266 |
| 6,794,781 B2 * | 9/2004 | Razzell et al. | 310/114 |
| 7,187,098 B2 * | 3/2007 | Hasebe et al. | 310/156.43 |
| 7,247,967 B2 * | 7/2007 | Ionel et al. | 310/216.086 |
| 7,723,888 B2 * | 5/2010 | Petek | 310/156.35 |
| 2006/0022552 A1 * | 2/2006 | Zhu et al. | 310/268 |
| 2006/0028093 A1 * | 2/2006 | Minagawa et al. | 310/268 |
| 2006/0131986 A1 * | 6/2006 | Hsu et al. | 310/268 |
| 2007/0046124 A1 * | 3/2007 | Aydin et al. | 310/156.37 |
| 2008/0001488 A1 * | 1/2008 | Pyrhonen et al. | 310/60 R |

FOREIGN PATENT DOCUMENTS

| | | |
|---|---|---|
| DE | 2727450 | 1/1978 |
| DE | 2727450 A1 | 1/1978 |
| DE | 211317 | 7/1984 |
| DE | 211317 A1 | 7/1984 |
| DE | 259286 | 12/1984 |
| DE | 229836 | 11/1985 |
| DE | 229836 A1 | 11/1985 |
| DE | 250614 | 10/1987 |
| DE | 250614 A1 | 10/1987 |
| DE | 252274 | 12/1987 |
| DE | 252274 A1 | 12/1987 |
| DE | 255824 | 4/1988 |
| DE | 255824 A1 | 4/1988 |
| DE | 259286 A1 | 8/1988 |
| DE | 3927453 | 2/1991 |
| DE | 3927453 C2 | 5/1991 |
| DE | 4314513 | 11/1994 |
| DE | 4314513 C2 | 11/1995 |
| DE | 19848123 | 3/2000 |
| DE | 10110719 | 11/2002 |
| DE | 10242833 | 4/2004 |
| DE | 10242833.6 | 9/2005 |
| DE | 102004006890 | 9/2005 |
| DE | 102004045939 | 4/2006 |
| DE | 102006036707 | 2/2008 |
| EP | 0305569 | 3/1989 |
| JP | 2006050703 | 2/2006 |

OTHER PUBLICATIONS

Oxford English Dictionary, Definition of the term "Disc", Apr. 30, 2013.*
Machine Translation, Marquardt, DE 102006036707 B3, Feb. 28, 2008.*
World Intellectual Property Organization, English translation of the Written Opinion for International Application No. PCT/EP2009/001854, mail date Aug. 31, 2009, pp. 1-7.
World Intellectual Property Organization, International Search Report and Written Opinion for International Application No. PCT/EP2009/001854, mail date Aug. 31, 2009, pp. 1-15.
Dr. Bernd Gellner, Response to Opposition for European Patent Application No. EP 2255431 B1, Mail Date Jul. 23, 2013.
Ioan-Adrian Viorel et al., "Direct drive systems with transverse flux reluctance motors," Acta Electrotehnica, Nov. 3, 2004, p. 33-40, vol. 45, No. 3.
K. Reichert and A. Binder, "Elektrische Maschinen und Antriebe Auswahl, Auslegung und Dimensionierung," VDE-Seminar, 2005, p. 1-2.
M. Siatkowski and B. Orlik, "Influence of Saturation Effects in a Transverse Flux Machine," 13th International Power Electronics and Motion Control Conference, 2008, p. 830-836, Bremen, Germany.
C. Steiniger, Opposition against European Patent EP 2 255 431 for Application No. 09723499.1, Mail Date Dec. 2, 2013.
Siatkowski et al., Influence of Saturation Effects in a Transverse Flux Machine, Journal, IEEE 2008, 13th International Power Electronics and Motion Control Conference (EPE-PEMC 2008), pp. 830-836.
Reichert et al., Elektrische Maschinen und Antriebe Auswahl, Auslegung und Dimensionierung, 2005 VDE-Seminar, Introduction and images C3-5 and C3-6, 2 pages.
Viorel et al., Direct Drive Systems With Transverse Flux Reluctance Motors, Acta Electrotehnica, vol. 45, No. 3, 2004, pp. 33-40.

* cited by examiner

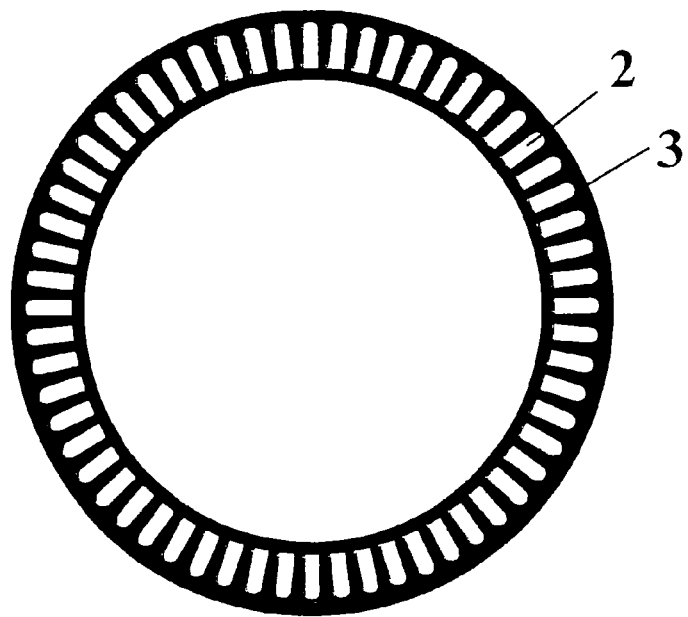
Fig. 1        Prior Art
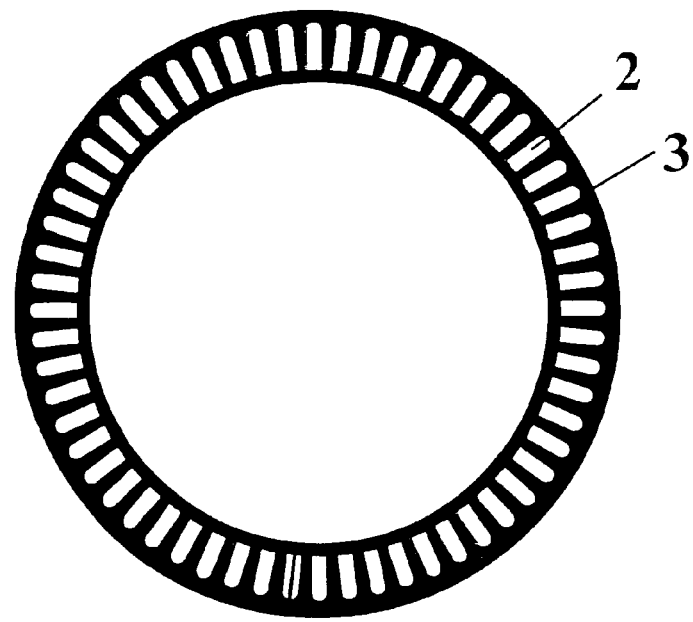
Fig. 2        Prior Art

LOW-INERTIA DIRECT DRIVE HAVING HIGH POWER DENSITY

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from International PCT Patent Application No. PCT/EP2009/001854, filed on Mar. 13, 2009 entitled, "LOW-INERTIA DIRECT DRIVE HAVING HIGH POWER DENSITY", which claims priority to DE Application No. 10 2008 014 556.4, filed on Mar. 15, 2008 entitled "LOW-INTERIA DIRECT DRIVE HAVING HIGH POWER DENSITY".

BACKGROUND

Field

The invention relates to electric machines which deliver high specific torque based on very low weight and short axial length and meet rigorous torque uniformity requirements. They are preferably used with a power electronic supply with high fundamental frequency, resulting in very high power densities.

Per the prior art, permanent magnet machines are the best way to meet the need for high specific torque. These drives are embodied either as polyphase, permanent magnet synchronous machines or as transverse flux machines, as these have short pole pitches and deliver high force density. The former type of design is prior art per inter alia DE 10 2004 045 939 (permanent magnet synchronous machine having suppression means for reducing torque ripple). It has inter alia the following key disadvantages:

a. To form a magnetic yoke, the rotor needs significant quantities of soft iron material, which increases the moment of inertia and weight.
b. The stator poles each have individual pole coils for electrical excitation. In the multiple-pole embodiments required for high force densities, this means greater expenditure on the windings and high copper loss in the stator.

The latter design is more favorable with regard to that issue, because the stator winding can be embodied as a simple ring winding, and embodiments with extremely large numbers of poles can be more readily achieved.

Designs for transverse flux machines are prior art per inter alia DE 101.10.719 (transverse flux machine having a plurality of single-strand exciter elements) and DE 198.48.123 (transverse flux machine with rotor collector).

Unfortunately these are complex, with numerous components, and have other disadvantages:

a. To guide and concentrate the field ("rotor collector") the rotor needs significant quantities of soft iron material in addition to the permanent magnets, which increases the moment of inertia and weight.
b. The resulting drive force is not satisfactorily uniform, which means a large number of strands (inter alia more than 3) and/or electronic controlling of the strand currents based on the rotor angle are required to reduce torque pulsation. Both of these are unfavorable, as they involve greater expenditure on the accompanying power electronics, and make it harder to achieve the desired performance levels. It is desirable in this regard to have an arrangement which, thanks to the operating principles involved, delivers high, largely constant usable torque per strand in a very wide rotor angle range, and hence two-phase (number of strands: 2) embodiments may be useful as well as inexpensive to produce.
c. The ring winding, though simple to implement, generates a disruptive stray field, which causes undesirable losses in adjacent metallic components. In confined installation situations this is a serious problem.

To avoid the disadvantages of ring windings, transverse flux machines having distributed winding may be used. An embodiment of this kind is prior art per DE 10 2004.006.890 (multiple-strand transverse flux machine having distributed winding).

In that embodiment, the pole pitch of the multiple-strand winding may be assigned to be several times greater than the distance governed by the rotor's permanent magnets, which means a larger winding cross section is available (as compared with a polyphase synchronous machine of equal pole pitch). However, the accompanying power electronics are disadvantageously expensive (see FIG. 5 in DE 10 2004 006 890); this is evident from the number of inverters needed and the rigorous requirements regarding switching frequencies and voltage reserves. Moreover, this embodiment still has the aforementioned disadvantages regarding mechanical design/production and the rotor's high moment of inertia.

Other types of embodiment of transverse flux machines are prior art per DE 102 42 833 6 (electrical drive device) and DE 102 006 036 707 (low inertia direct drive). Both of these have rotors which are disc-shaped, bear permanent magnets, and do not contain any additional soft iron material. This is advantageous in terms of the moment of inertia. However, the former embodiment (DE 102 42 833 6) requires a very large number of permanent magnets, arranged in at least two (or respectively four, see FIG. 3 of that patent) concentric rings. This makes the rotor more difficult to produce and less mechanically strong. The question of mechanical strength is significant, because the rigidity is reduced due to the gaps between the concentric rings. By comparison, the rotor in DE 10 2000 6036 707 is easier to manufacture and considerably more rigid. It is known that high rigidity is important for slim, disc-shaped rotors.

Per DE 102 42 833 6, the accompanying stator comprises a plurality of U-shaped stator plates (34) arranged in the form of cylindrical rings to the left and right of the rotor. The hollow spaces between the stator plates are filled with supports made of non-magnetic material, to provide stability and to prevent impairment of the magnetic flux. However, the joints between the U-shaped stator plates and the supports are extremely unfavorable in terms of manufacturing expense, mechanical stability and durability, as borne out in practice with similar transverse flux machines.

Naturally it ought to be feasible to replace the U-shaped stator plates (made of inter alia soft magnetic metal plates) with similar components made of powder composite material, since in principle those materials can always be used as an alternative in electrical machines.

However, since soft magnetic powder composite materials have considerably less—at least ten times less—permeability than full metal, there are major disadvantages and reduced performance unless additional inventive measures are taken.

Those disadvantages are:
a. Torque/performance reduced, typically by at least 40%.
b. Significant increase in stray flux and disruptive external stray fields causing undesirable losses in adjacent metallic components.

The object of the present invention is to avoid the aforementioned disadvantages and to provide an improved direct drive with increased power density, notwithstanding the fact that composite materials with low permeability are used.

A further object of the invention is to be able to use the rotor embodiment described in DE 10 2006 036 707, which is advantageous both mechanically and from a manufacturing standpoint (see FIG. 1). The goal is for the arrangement of the permanent magnets (2) in a single row, and the resulting small number of magnets and low magnet mass in this rotor embodiment, to be usable for single- as well as multi-phase machines.

Furthermore, according to the invention the permanent magnets (2) may be usefully segmented in the radial direction, thus ensuring the rotor disc remains rigid. This is shown in FIG. 2 (example of lower permanent magnet (2)).

Another object of the invention is to improve the stator in terms of manufacturing expense, mechanical stability and durability. Reducing the number of stator windings (4) and their connectors is advantageous and desirable with a view to keeping manufacturing costs down.

According to the invention, these goals are achieved by embodying the rotor and stator as described in claim 1 and the further claims. The invention is explained in greater detail with the help of the Drawings.

DESCRIPTION OF THE DRAWINGS

FIG. 1 depicts a rotor disc known per DE 10 2006 036 707 (low inertia direct drive).

FIG. 2 depicts a rotor disc similar to that in FIG. 1, known per the aforementioned patent DE 10 2006 036 707.

DETAILED DESCRIPTION

FIG. 1 is a rotor disc known per DE 10 2006 036 707 (low inertia direct drive). It comprises a mounting ring (3) made of non-magnetic material, preferably fiber-reinforced plastic, having notches for insertion of permanent magnets (2). Further design details and types of embodiment are described in the aforementioned patent. The permanent magnets (2) are oriented in the mounting ring so that the line connecting their magnetic north and south poles points in the circumferential direction, and the adjacent permanent magnets (2) repel each other. This too is known per the aforementioned patent.

FIG. 2 is a rotor disc similar to that in FIG. 1, known per the aforementioned patent DE 10 2006 036 707. To illustrate an advantageous segmentation direction for the permanent magnets (2), one of the lower permanent magnets (2) is shown as segmented by way of example.

Figure 3:
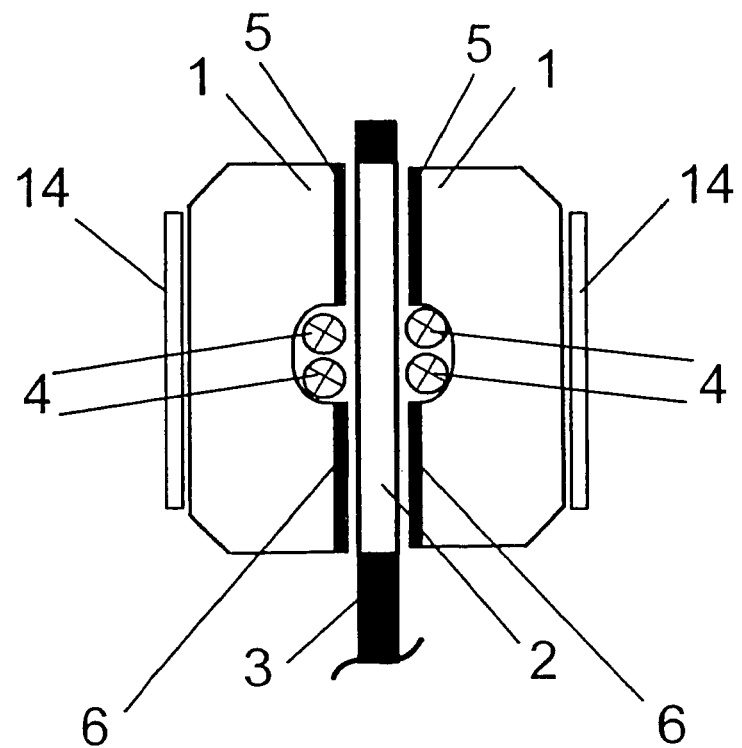
FIG. 3 is a section through the exterior of an exemplary embodiment of a direct drive according to the invention (direction of view: perpendicular to the drive's rotational axis).

FIG. 3 is a section through the exterior of an exemplary embodiment of a direct drive according to the invention (direction of view: perpendicular to the drive's rotational axis). The stator blocks (1), made of soft magnetic composite material, preferably cover the entire circumference of the rotor and hence are in the form of circular rings. The left- and right-hand stator blocks (1) are joined mechanically, for example by a cylindrical tube made of non-magnetic material.

Figure 4:
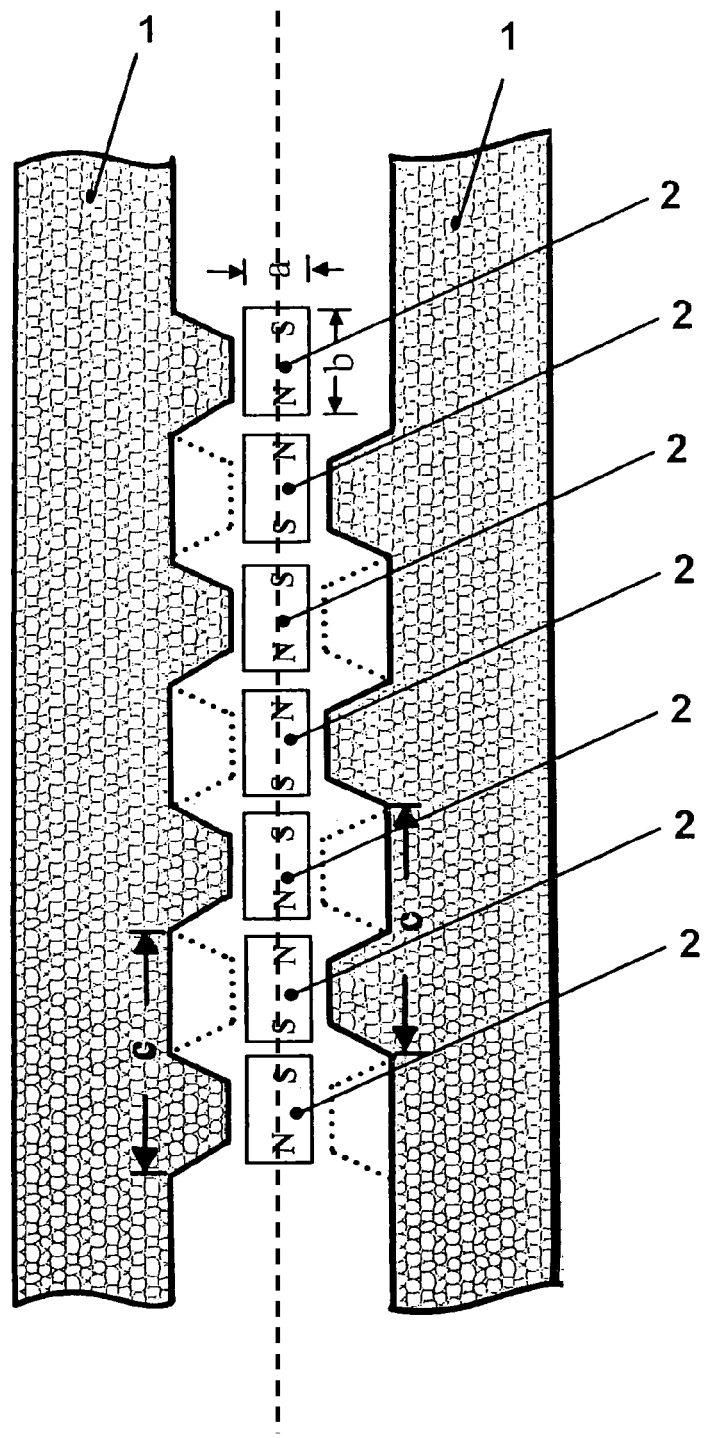
FIG. 4 is a view from the exterior (perpendicular to the mechanical rotational axis) of the stator blocks (1) and the rotor's permanent magnets (2).

The stator windings (4) are located in circumferential annular grooves on one side of each stator block (1). They may be embodied as ring windings per the prior art. Radially grooved outer boundary surfaces (5) and inner boundary surfaces (6) are provided on one side of each stator block (1). In the direction of view in FIG. 3 these areas are not directly visible and are therefore shown in black for clarity's sake. The pitch of the grooves is oriented to that of the rotor, as shown in FIG. 4. According to the invention, the grooves of the radially outer grooved boundary surfaces (5) and the grooves of the radially inner grooved boundary surfaces (6) have an angular offset of half a pitch relative to each other, corresponding to half an electrical period. Moreover, the left-hand grooves, located at the same respective radius, have the same angular offset relative to the right-hand grooves.

Furthermore, according to the invention optional short circuit rings (14) are provided in close proximity to the stator blocks (1). This is explained with the help of FIG. 4.

FIG. 4 is a view from the exterior (perpendicular to the mechanical rotational axis) of the stator blocks (1) and the rotor's permanent magnets (2). For clarity's sake, a linear rendition is shown, thus disregarding the arc-shaped curvature. Moreover, the rotor's mechanical parts, including the mounting ring (3), have been omitted for clarity's sake. a, b, and c indicate the following dimensions:

a: dimension of the permanent magnets (2) in the axial direction
b: gauge of the permanent magnets (2) in the direction of magnetization
c: pitch of the grooves in the stator blocks (1).

In the schematic linear view in FIG. 4, the pitch is shown as a length. Without this schematization, in fact an angular dimension would be correct.

The outer grooved boundary surfaces (5) of the stator blocks (1) are shown in solid lines. The inner grooved boundary surfaces (6) of the stator blocks (1) are shown using broken lines. Thanks to this arrangement according to the invention, despite the low permeability of the composite material of the stator blocks (1) there is less scatter, and virtually all the flux of permanent magnets (2) can be utilized. Based on equal radial dimensions, one can achieve force densities approximately 40-50% greater than those achievable with high permeability U-shaped stator plates and their accompanying complex rotor design with its plurality of concentric magnet rings (prior art per DE 102 42 833 6).

However, there is a different type of disadvantage associated with the low-permeability soft magnetic composite material: the powerful external stray field of the stator blocks (1). According to the invention, this can be reduced by providing short circuit rings (14) made of material having good electrical conductivity close to the stator blocks (1). These short circuit rings (14) are inexpensive and easy to use with the direct drive according to the invention, particularly for the following reasons:

The short circuit rings (14) do not have to be electrically connected, and it is not absolutely mandatory to electrically insulate them from the stator blocks (1).

To minimize current heat loss, the short circuit rings (14) may be embodied with a relatively large cross section in a manner that saves space.

The short circuit rings (14) may be embodied as hollow, with coolant running through their interior, thereby also cooling the adjacent stator blocks (1) via thermal conduction.

The latter may be especially advantageously provided, since electrical insulation from the stator blocks (1), which would hinder heat conduction, may not be necessary.

Nonetheless, if the stator material has high electrical conductivity it may be desirable to ensure that the induced circulating current in the material of the short circuit rings (14) is as localized as possible. In such cases sufficient insulation may be achieved by anodizing the aluminum surface of the short circuit rings (14) if they are made of aluminum. If copper material is used, a thin insulating foil for example may be provided between the stator blocks (1) and the short circuit rings (14). But as a general rule, no electrical insulation is required if composite material is used for the stator.

The aforementioned options for cooling may be advantageous because direct liquid cooling of the stator blocks, e.g. via holes passing through them per the prior art, is often problematic. One of the reasons behind this known problem is that the stator materials may corrode due to direct contact with the coolant. Another reason is that cooling channels or holes in the stator blocks (1) may weaken the magnetic cross sections.

There are many ways to approach the geometric design of the short circuit rings (14). If for example one intends to minimize the axial length of the direct drive according to the invention, it may be advantageous to divide them into two concentric short circuit rings. As a result, in the axial direction one can make maximum use of the space near the stator winding (4) for the stator material.

In light of the short circuit rings' function, a person skilled in the art may wish to use a plurality of short circuit rings arranged in series or parallel as desired.

Figure 5:
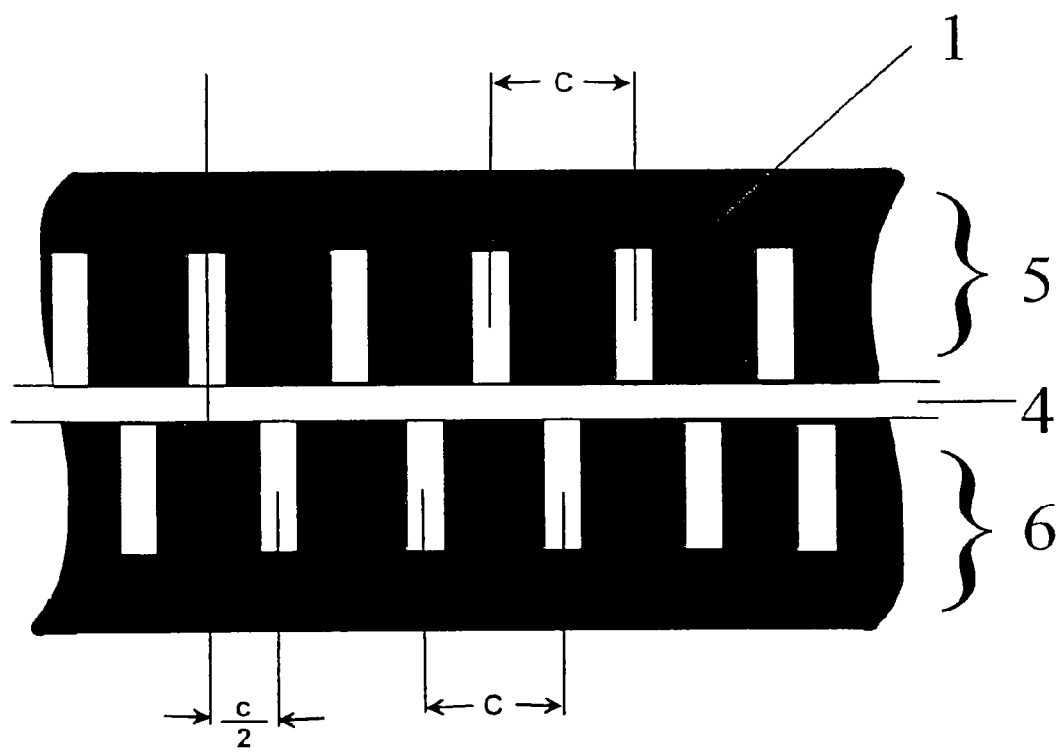
FIG. 5 is a schematic view of the grooved boundary surfaces (5) and (6) of the stator blocks (1) in the direction parallel to the direct drive's rotational axis.

FIG. 5 is a view of the grooved boundary surfaces (5) and (6) of the stator blocks (1) in the direction parallel to the direct drive's rotational axis. This is a schematic representation showing only a small section, and as before the curvature has been disregarded (linear rendition). The areas lying deeper in the plane of the drawing, i.e. the grooved areas, are black, while the higher areas of the boundary surfaces (5) and (6) are white. Accordingly, the white areas may in this case be designated pole surfaces. In the middle is the area having the stator winding (4) (FIG. 5 is not to scale, and the geometric proportions have been optimized). FIG. 5 provides further explanation of what is shown in FIG. 4, and in particular shows once again the offset (explained above) between the grooves of the outer boundary surfaces (5) and the inner boundary surfaces (6), this time from a different view.

Figure 6:
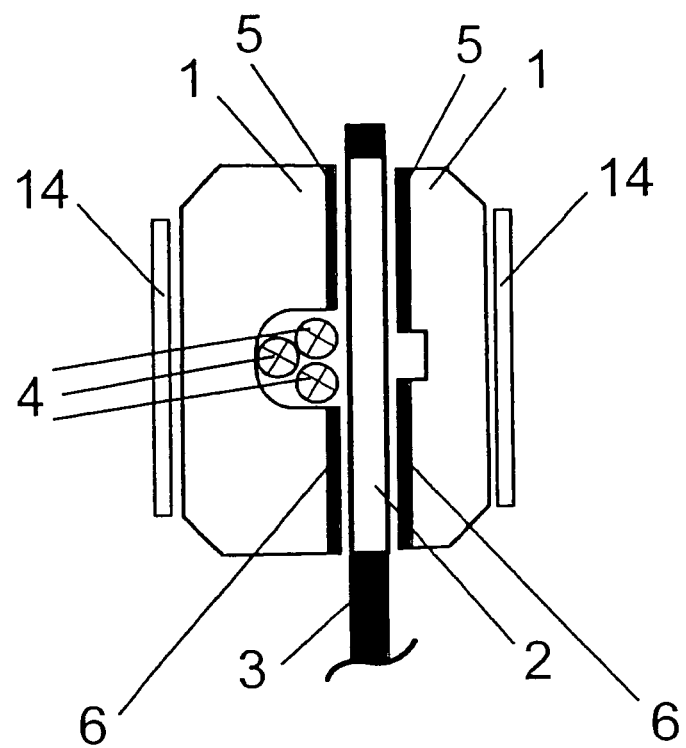
FIG. 6 is a section through the exterior of another exemplary embodiment of a direct drive according to the invention similar to FIG. 3 but with the stator windings (4) located in only one of the two stator blocks (1).

FIG. 6 is a further embodiment similar to FIG. 3. By contrast with FIG. 3, the stator windings (4) are located in only one of the two stator blocks (1). In direct drives according to the invention this may be particularly useful, due to the optimized magnetic circuit and extremely low scatter. Embodying the stator winding (4) asymmetrically in this way means there is no significant impairment of the torque. Advantageously, the manufacturing process can be simplified, fewer electrical connections are needed, and the electrical connections of the stator winding (4) are more accessible. The latter issue is often significant in confined installation situations. Furthermore, it is easier to embody the stator windings as hollow conductors with interior cooling, which is advantageous for all direct drives according to the invention.

It is also evident from FIG. 6 that with this type of embodiment the dimensions of the stator block (1) and annular grooves, and the number of windings for the stator windings, can be varied and optimized such that the arrangement according to the invention shown in FIG. 6 is equal or superior to the one in FIG. 3 in terms of torque, performance and efficiency. As shown in FIG. 6, the fact that one can usefully reduce the size of the winding-less annular groove in the right-hand stator block is essentially a result of the very low-scatter basic arrangement according to the invention as per claim 1.

Figure 7:
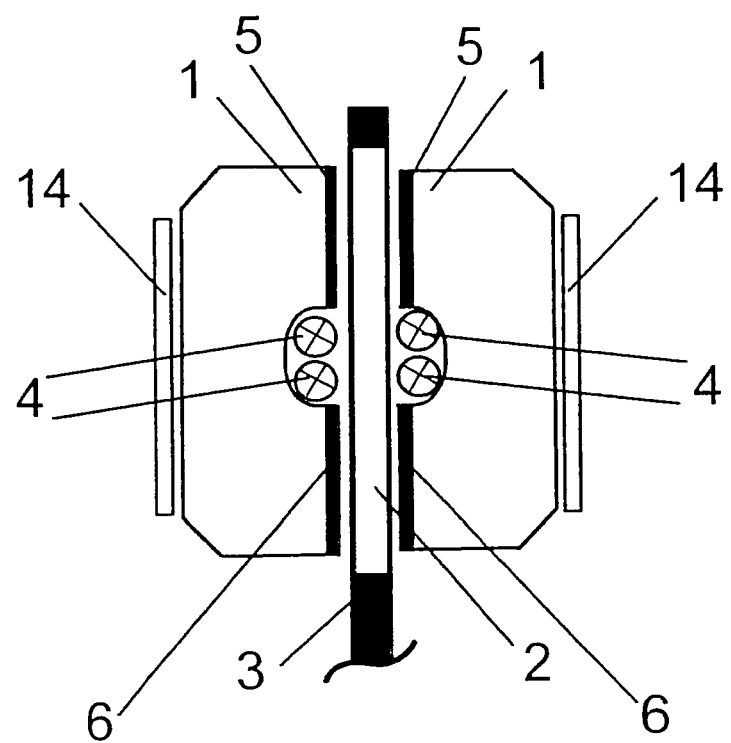
FIG. 7 is a section through the exterior of another exemplary embodiment of a direct drive according to the invention in an arrangement as per FIG. 6, but which differs in that the permanent magnets (2) are radially elongated.

FIG. 7 is an arrangement as per FIG. 6, but which differs in that the permanent magnets (2) are radially elongated. This characteristic according to the invention allows one to further boost the torque and performance based on the same stator block weight. In direct drives according to the invention, the rotor weight may be less than the stator weight by a factor of 10 or more, which means the slight increase in the mass of the permanent magnets (2) is of little significance. Moreover, in light of their torque and performance direct drives according to the invention contain relatively small quantities of magnetic material, hence the increase in cost is only slight.

Figure 8:
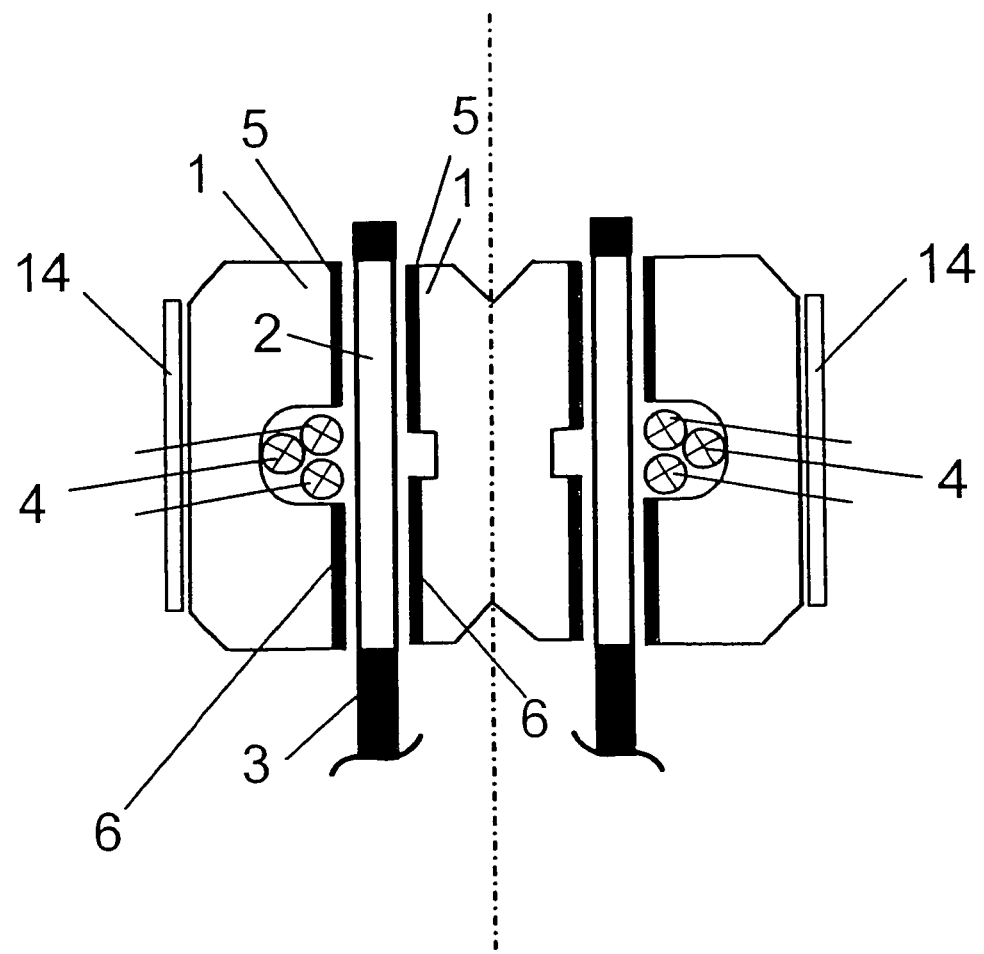
FIG. 8 is a sectional view of a two-phase direct drive.

FIG. 8 is a two-phase direct drive which, when supplied with two stator currents having 90° phase shift, can meet very rigorous torque uniformity requirements. This arrangement can basically be conceived as having two of the arrangements shown in FIG. 6. The triangular indentations in the middle, winding-less stator block (1) may also be embodied as deeper, so as to optimally decouple the left and right magnetic circuits. Complete mechanical separation of the stator block along the broken line of symmetry is also feasible.

Figure 9:
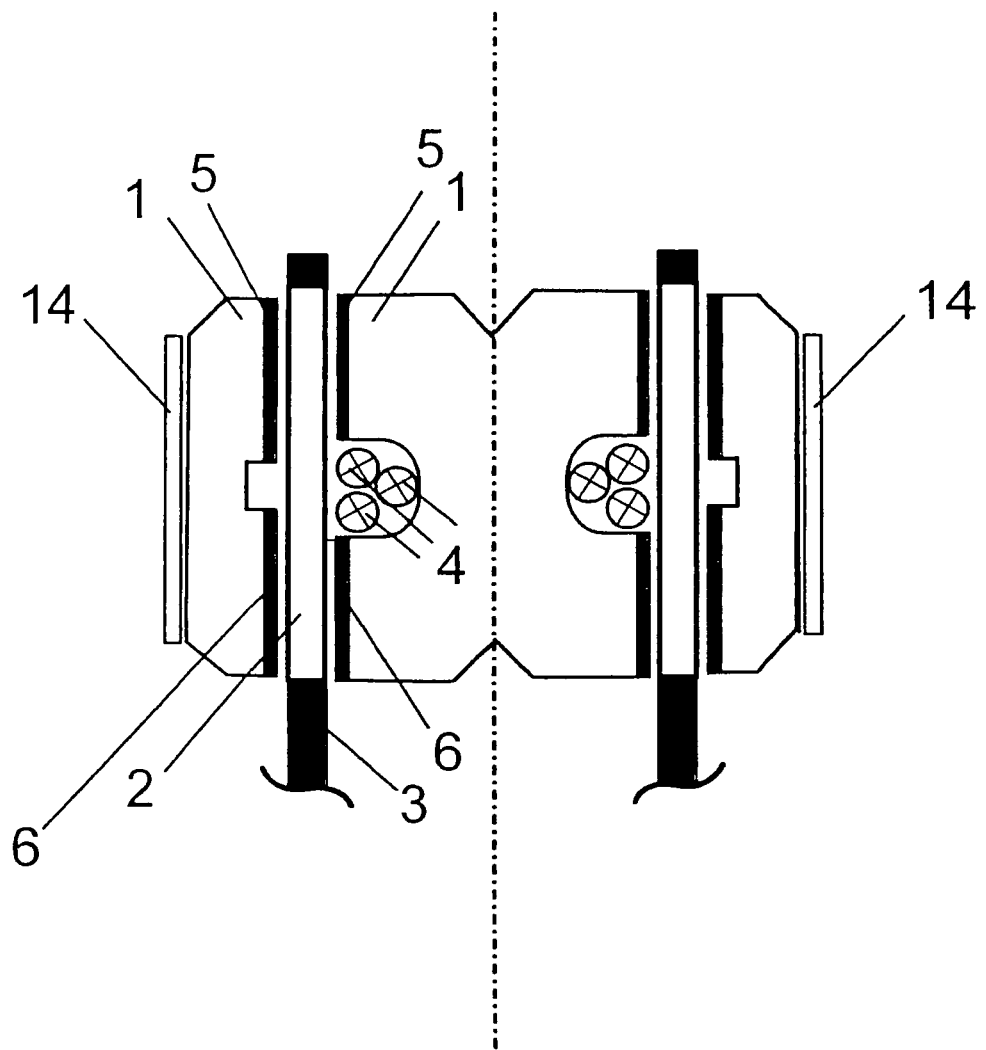
FIG. 9 a sectional view of a two-phase direct drive similar to the one in FIG. 8, but with the stator blocks (1) mirror-inverted relative to FIG. 8.

FIG. 9 is an arrangement similar to the one in FIG. 8; however, the arrangement of the stator blocks (1) is mirror-inverted relative to FIG. 8. This has the advantage that the two stator windings (4) of the two electrical phase phases are located in the same stator block (1). Depending on the application, this may be advantageous in terms of manufacturing processes, mechanical aspects and connections.

Figure 10:
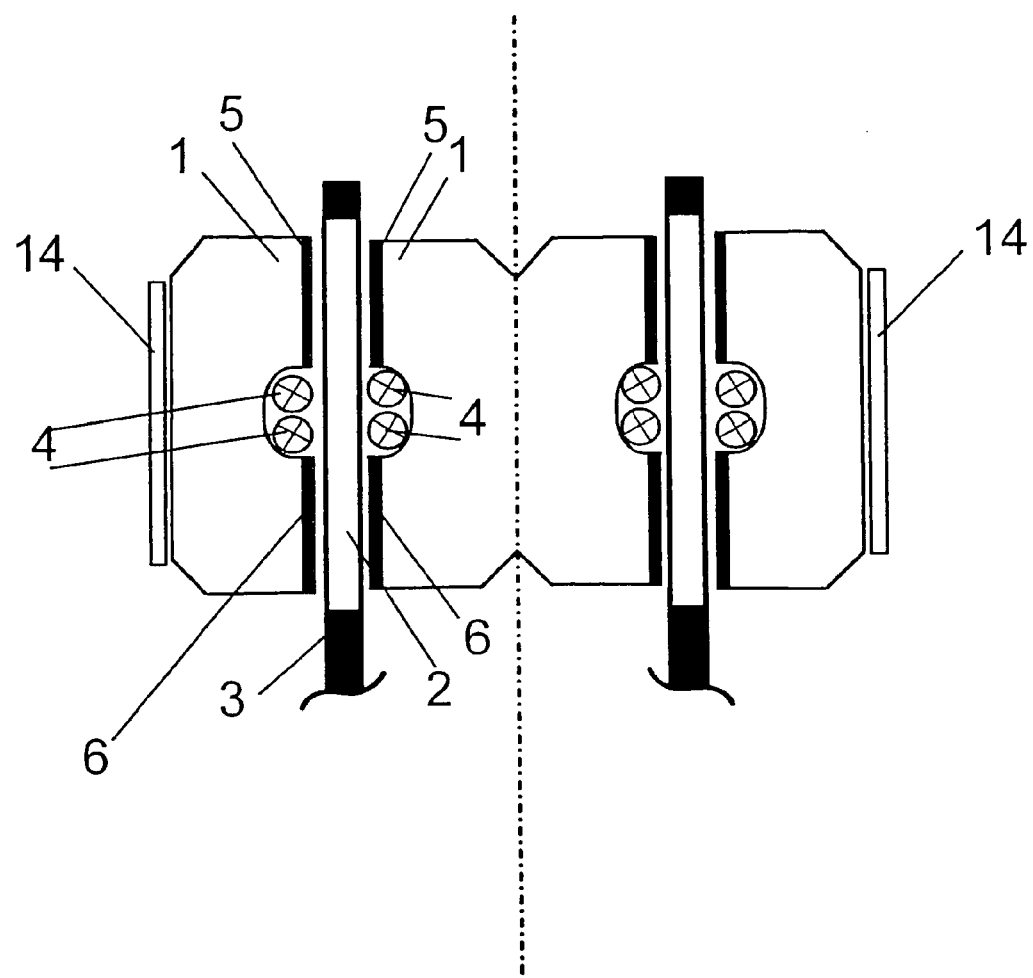
FIG. 10 is a sectional view of a two-phase arrangement formed from two arrangements per FIG. 3.

FIG. 10 is a two-phase arrangement formed from two arrangements per FIG. 3. As a general rule it is less advantageous, due to the large number of electrical connections.

Figure 11:
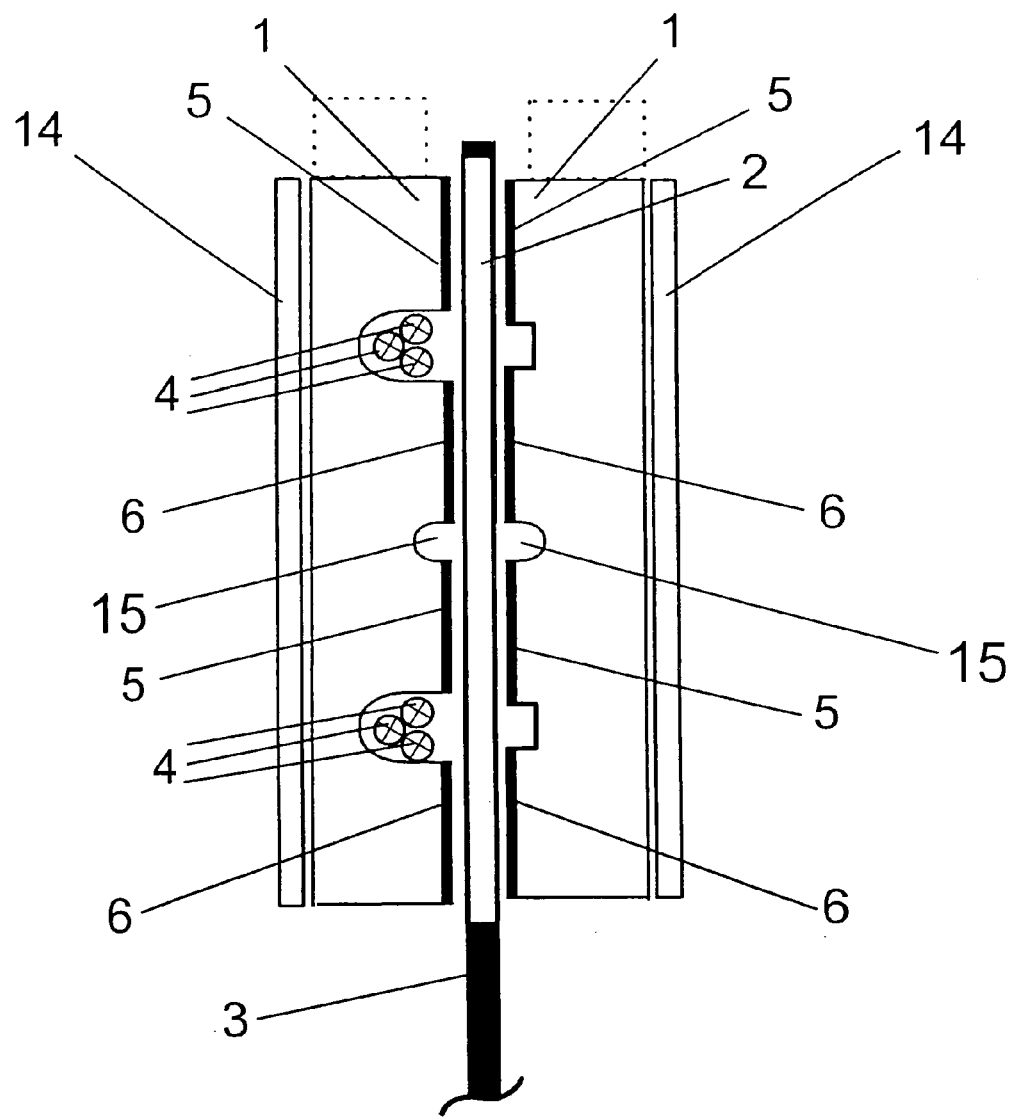
FIG. 11 is sectional view of a further arrangement according to the invention for a multi-phase drive.

FIG. 11 is a further arrangement according to the invention for a multi-phase drive. This is preferably used for very large diameter direct drives. In such cases it is possible and useful to arrange two or a plurality of stators of direct drives according to the invention concentrically within one another. The stator blocks (1) may remain mechanically connected as a single component as long as the electrical phases are magnetically decoupled by circumferential separator grooves (15). If one wants the resulting two-phase drive (FIG. 11) to deliver mean drive torque equal to that of the original arrangement (FIG. 3), basically the same rotor disc with permanent magnets (2) having the same dimensions may be used. FIG. 11 is thus not to scale, and shows an embodiment having greater torque.

If the arrangement has a large diameter, slight differences in the torque between the radially outer and inner phases may be disregarded as long as the radial dimensions of the stator blocks (1) are small relative to the diameter. That prerequisite is usually met anyway by minimizing the weight, or at any rate is an objective. One may also offset any remaining minor differences in the torque by making slight modifications to the dimensions of radial grooves (5) and (6).

Figure 12:
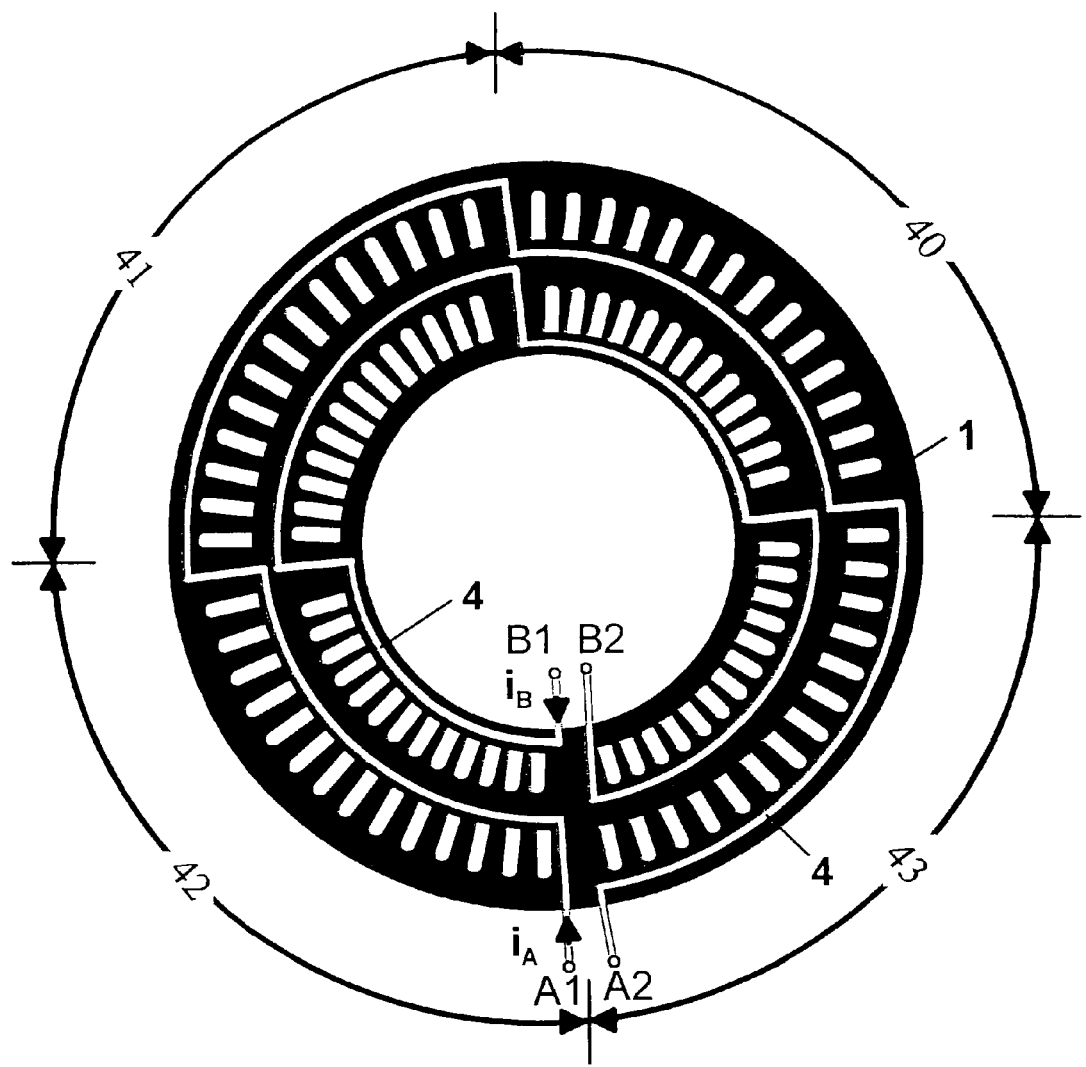
FIG. 12 depicts a multi-phase drive requiring just one rotor disc.

FIG. 12 is a further characteristic that makes it possible to embody a multi-phase drive requiring just one rotor disc. As before, the easily manufactured rotor disc may have the same design and dimensions, as explained above are FIG. 11. The grooved areas (5) and (6) of the stator blocks (1) are divided into a plurality of sectors. FIG. 12 shows this principle, using the example of a two-phase drive.

Stator windings (4) for energization of the first phase having connectors A1 and A2 and stator windings for energization of the second phase having connectors B1 and B2 are provided. The accompanying currents ($i_A$) and ($i_B$) have a 90° phase shift relative to each other, as is known for two-phase drives.

Sectors (42) and (40) are assigned to the first electrical phase. Sectors (41) and (43) are assigned to the second electrical phase. In the latter sectors (41) and (43), the grooves in radially grooved boundary surfaces (5) and (6) have an angular offset of a quarter pitch (c/4) relative to those in the former sectors. Wider radial grooves may be inserted between the sectors (although a small number of pole surfaces may be lost as a result), thereby also allowing the stator windings (4) to exit radially to the external connectors.

Thanks to these characteristics, the rotor disc and the stator blocks (1) may remain simple in terms of manufacturing. In particular, they do not have to have multiple mechanical parts, which would make them weaker and harder to install. The only aspect which is slightly more complex is the embodiment of the stator windings: in the respective sectors not used by the electrical phase in question, the stator windings (4) must travel outside the actual annular groove.

In FIG. 12 this can only be shown by radially shifting the stator windings (4) in the plane of the drawing. In drives according to the invention, in said sector areas the stator windings (4) may advantageously travel on the side of the stator block (1) facing away from the air opening, e.g. in the beveled corners near the short circuit rings (14). This does not require any significant extra space.

The only notable disadvantage of a multi-phase drive having sectors as described is that the stator windings (4) have to be longer. Embodiments having three or more electrical phases and a larger number of sectors are also feasible.

It is claimed:

1. A direct drive comprising:
   a first rotor comprising a non-magnetic disc bearing a single ring of permanent magnets; and
   a first set of two stator blocks facing each side of the first rotor, the stator blocks made of soft magnetic composite material in the shape of circular rings having radially grooved outer boundary surfaces that face an outer circumferential portion of the ring of permanent magnets, and radially grooved inner boundary surfaces disposed radially inward with respect to the outer boundary surfaces, the inner boundary surfaces facing an inner circumferential portion of the ring of permanent magnets, wherein
   the grooves in the outer boundary surfaces and the grooves in the inner boundary surfaces have an angular offset of half a pitch relative to one another, and are separated by a circumferential annular groove, and
   a stator winding is located in a circumferential annular groove of at least one stator block.

2. The direct drive according to claim 1, wherein the permanent magnets in the ring of permanent magnets are oriented so that the line connecting their magnetic north and south poles points in the circumferential direction and adjacent permanent magnets repel each other.

3. The direct drive according to claim 1, wherein the permanent magnets in the ring of permanent magnets have separating joints in the radial direction or are completely divided into individual partial magnets.

4. The direct drive according to claim 1, wherein the stator winding is provided on only one side of the rotor.

5. The direct drive according to claim 4, wherein the circumferential annular groove in stator block that does not carry a winding has a smaller radial and/or axial dimension than the circumferential annular groove in the stator block that does carry a winding.

6. The direct drive according to claim 1, further comprising:
   short circuit rings made of electrically conductive material disposed in close proximity to the sides of the stator blocks facing away from the first rotor.

7. The direct drive according to claim 6, wherein the short circuit rings are hollow.

8. The direct drive according to claim 6, wherein the short circuit rings are configured for a coolant to flow through their interiors, thereby cooling the adjacent stator blocks by thermal conduction.

9. The direct drive according to claim 1, wherein
   the ring of permanent magnets extends beyond the grooved outer boundary surfaces in a radially outward direction, and/or
   the ring of permanent magnets extends beyond the grooved inner boundary surfaces in a radially inward direction.

10. The direct drive according to claim 1, wherein the inner and outer boundary surfaces are separated by a circumferential separator groove or are mechanically completely separate.

11. The direct drive according to claim 1, wherein the radially grooved boundary surfaces of the stator blocks are divided into sectors, and grooves in one or a plurality of these sectors have an angular offset relative to each other.

12. The direct drive according to claim 11, wherein the sectors have separate stator windings driven by different electrical phases.

13. The direct drive according to claim 1, wherein the stator winding is provided on both sides of the rotor.

14. The direct drive according to claim 1, wherein
the first rotor is one of a plurality of rotors coupled to rotate about a common axis, and
the first set of two stator blocks is one of a plurality of sets of stator blocks, each set of stator blocks facing both sides of a respective one of the rotors.

15. The direct drive according to claim 14, wherein stator blocks between adjacent rotors are mechanically joined in pairs to form a single component.

* * * * *